(12) United States Patent
Kavali et al.

(10) Patent No.: US 11,797,414 B2
(45) Date of Patent: Oct. 24, 2023

(54) METHOD AND SYSTEM FOR FAILURE PREDICTION IN CLOUD COMPUTING PLATFORMS

(71) Applicant: Oracle International Corporation, Redwood Shores, CA (US)

(72) Inventors: Devarajulu Kavali, Santa Clara, CA (US); Devaraj Das, Fremont, CA (US); Puneet Jaiswal, Milpitas, CA (US); Kumar Satyam, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 308 days.

(21) Appl. No.: 17/200,228

(22) Filed: Mar. 12, 2021

(65) Prior Publication Data

US 2022/0292008 A1   Sep. 15, 2022

(51) Int. Cl.
| | |
|---|---|
| *G06F 11/34* | (2006.01) |
| *G06F 11/30* | (2006.01) |
| *G06N 20/00* | (2019.01) |
| *G06F 9/50* | (2006.01) |
| *G06F 11/07* | (2006.01) |
| *G06F 18/214* | (2023.01) |

(52) U.S. Cl.
CPC ........ *G06F 11/3419* (2013.01); *G06F 9/5027* (2013.01); *G06F 11/0772* (2013.01); *G06F 11/3048* (2013.01); *G06F 11/3072* (2013.01); *G06F 11/3447* (2013.01); *G06F 18/214* (2023.01); *G06N 20/00* (2019.01)

(58) Field of Classification Search
CPC ............. G06F 11/3447; G06F 11/3452; G06F 11/3048; G06F 11/3072; G06F 11/3051; G06N 20/00
See application file for complete search history.

(56) References Cited

U.S. PATENT DOCUMENTS

| | | | |
|---|---|---|---|
| 11,106,994 B1* | 8/2021 | Batalov | G06N 5/04 |
| 2020/0065212 A1* | 2/2020 | Chanda | G06F 11/0751 |
| 2020/0319877 A1* | 10/2020 | Glazer | G06F 9/44505 |
| 2021/0383271 A1* | 12/2021 | Slinger | G06F 11/3409 |
| 2022/0067573 A1* | 3/2022 | Munguia Tapia | G06F 11/3495 |

\* cited by examiner

*Primary Examiner* — Yolanda L Wilson
(74) *Attorney, Agent, or Firm* — Invoke

(57) ABSTRACT

The present disclosure relates to system and techniques for prediction of failures in resources deployed in a data plane of a cloud based infrastructure. The resource are selected from a plurality of cloud based resources arranged in a hierarchical manner and allocated to a client device. A predictor employs a first prediction model to obtain a first prediction of a failure of a resource, and a second prediction model to obtain a second prediction of the failure of the resource. Weights are assigned to the first prediction and second prediction based at least in part on a criterion. The predictor computes an overall prediction of the failure of the resource based at least in part on at least one of the first prediction, the second prediction or the respective weights assigned to the predictions. The overall prediction is utilized for restoring the failure of the resource.

20 Claims, 12 Drawing Sheets

METHOD AND SYSTEM FOR FAILURE PREDICTION IN CLOUD COMPUTING PLATFORMS

BACKGROUND

Cloud-based platforms have become increasingly common for end-to-end data management in database systems. Such cloud-based platforms may offer entire suites of cloud solutions built around a customer's data. However, customers can be negatively impacted by computing device failures, service unavailability, and even other customers' usage of the cloud platform.

Embodiments described herein address these and other problems, individually and collectively.

BRIEF SUMMARY

Techniques are provided (e.g., a method, a system, non-transitory computer-readable medium storing code or instructions executable by one or more processors) for enabling provisioning of cloud services for a client in an automated and scalable manner. Various embodiments are described herein, including methods, systems, non-transitory computer-readable storage media storing programs, code, or instructions executable by one or more processors, and the like.

One embodiment is directed to a method comprising retrieving a first prediction model and a second prediction model from a database. A first prediction of a failure of a resource is obtained based at least in part on the first prediction model, and a second prediction of the failure of the resource is obtained based at least in part on the second prediction model. A first weight to be assigned to the first prediction and a second weight to be assigned to the second prediction is determined based at least in part on a criterion. An overall prediction of the failure of the resource is computed based at least in part on at least one of the first weight, the second weight, the first prediction, or the second prediction, and the overall prediction is utilized for restoring the failure of the resource, the resource being one of a plurality of cloud based resources arranged in a hierarchical manner and allocated to a client device.

Another embodiment is directed to a computing device comprising a processor; and a memory including instructions that, when executed with the processor, cause the computing device to retrieve a first prediction model and a second prediction model from a database; obtain a first prediction of a failure of a resource based at least in part on the first prediction model, and a second prediction of the failure of the resource based at least in part on the second prediction model; determine a first weight to be assigned to the first prediction and a second weight to be assigned to the second prediction based at least in part on a criterion; compute an overall prediction of the failure of the resource based at least in part on at least one of the first weight, the second weight, the first prediction, or the second prediction; and transmit the overall prediction for restoring the failure of the resource, the resource being one of a plurality of cloud based resources arranged in a hierarchical manner and allocated to a client device.

Yet another embodiment is directed to a non-transitory computer readable medium storing specific computer-executable instructions that, when executed by a processor, cause a computer system to at least: retrieve a first prediction model and a second prediction model from a database; obtain a first prediction of a failure of a resource based at least in part on the first prediction model, and a second prediction of the failure of the resource based at least in part on the second prediction model; determine a first weight to be assigned to the first prediction and a second weight to be assigned to the second prediction based at least in part on a criterion; compute an overall prediction of the failure of the resource based at least in part on at least one of the first weight, the second weight, the first prediction, or the second prediction; and transmit the overall prediction for restoring the failure of the resource, the resource being one of a plurality of cloud based resources arranged in a hierarchical manner and allocated to a client device.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Cloud-based platforms have become increasingly common for end-to-end data management in database systems. Such cloud-based platforms offer entire suites of cloud solutions built around a customer's data. Typically, a customer (also referred to herein as a tenant) subscribes to the cloud based platform, which provisions resources (e.g., in a data plane of the platform) for the tenants usage. With an increasing number of tenants subscribing to such cloud platforms, the resources allocated to the tenants have to be monitored for failures. A large number of failures in the resources allocated to different tenants cause the cloud based platform to become increasingly disordered (i.e., a property typically referred to as an entropy of the cloud based system). Furthermore, detected failures in the resources have to be corrected in a timely manner to provide a seamless user experience to the tenants. In conventional cloud based systems, failures in the resources and the subsequent repair of the failed resources entails a large degree of human intervention. As such, vast amounts of delay incurred in the monitoring and repairing of cloud resources leads to poor tenant experience.

To address the above stated problems, the present disclosure provides for an anti-entropy system, which is designed to counter tendencies of the cloud based system in becoming disordered. Specifically, embodiments of the present disclosure provide for a predictor which generates/trains one or more machine learning models to proactively predict for occurrences of failures in resources deployed in a data plane of the cloud based platform. Moreover, techniques described herein provide for an automated mechanism of detecting and repairing failed resources. As such, a seamless mechanism is offered to different tenants who expect their respectively allocated resources to be functioning at all times. Additionally, the anti-entropy system of the present disclosure provides for a number of additional advantages over conventional systems. For example, the embodiments described herein provide for a scalable mechanism for detecting and correcting failures in cloud resources, especially when cloud based systems experience an ever-increasing number of tenant subscriptions.

Figure 1:
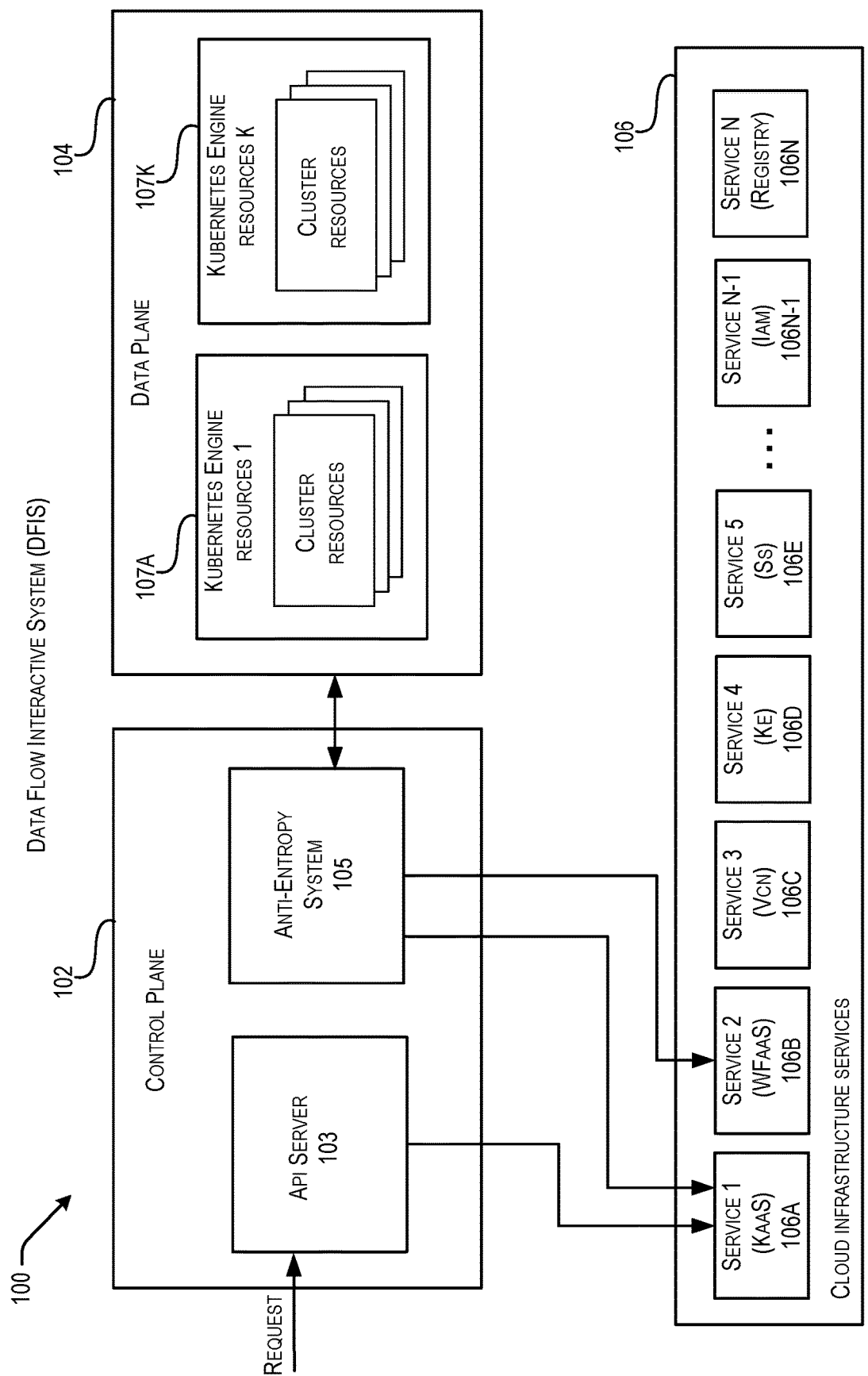
FIG. 1 depicts an exemplary data-flow interactive system in accordance with various embodiments.

FIG. 1 depicts an exemplary data flow interactive system in accordance with various embodiments. The data flow interactive system (DFIS) 100 includes a control plane 102, a data plane 104, and a pool of services 106 (referred to herein as cloud infrastructure services). The control plane 102 includes an API server 103, and an anti-entropy system 105. Resources allocated to a tenant (i.e., a user/client device) are deployed in the data plane 104. By some embodiments, the resources allocated to a tenant are selected from a plurality of cloud based resources that are arranged in a hierarchical manner. For instance, as shown in FIG. 1, resource 107A that is allocated to a certain tenant may include a kubernetes engine resource, a cluster resource, software components etc. The pool of services 106 includes a plurality of cloud infrastructure services 106A, 106B . . . 106N. Such services may include workflow as a service (WFaaS), key-value database as a service (KaaS), virtual cloud network (VCN), Kubernetes engine (KE), streaming service (SS), identity and access management (IAM) services, and a registry.

A tenant/user triggers operations of the DFIS by issuing a request to the API server 103. By some embodiment, the operations initiated by the tenant may be at least one of a create operation, a read operation, an update operation, or a delete operation, which are referred to herein as CRUD operations. The request issued by the tenant includes information i.e., metadata associated with the request. The metadata may include information related to an amount of resource(s) and/or type of resource(s) requested by the tenant. For example, for a create operation, the request may specify a number of worker nodes requested, an instance of a master node and the like.

Upon receiving the request from the tenant, the API server 103 stores the request (and metadata associated therewith) in a database e.g. in the KaaS database 106A. Further, the API server 103 notifies the anti-entropy system 105 to commence provisioning the request for the tenant. By some embodiments, the anti-entropy system 105 leverages workflow as a service (WFaaS) 106B to provision the resources for the tenant in the data plane 104. Each tenant is allocated a cluster of resources in the data plane 104 e.g., cluster of resources 107A, 107K etc. As stated previously, the resources allocated to a tenant are selected from a plurality of cloud based resources that are arranged in a hierarchical manner. By some embodiments, the hierarchy of resources may include a kubernetes engine resource at a first level, a cluster resource at a second level, and software components at a third level. For each level, the corresponding resource may include sub-resources. For example, the kubernetes engine resource may include a load balancer gateway resource, a VCN, node pools, default route tables, security lists etc. Further, the cluster level resource may include node pool subnets, node pool workers, node pool master, an ingress load balancer etc., whereas the software component resource level may include sub-resources such as a kubernetes operator, driver, executor, an ingress controller, etc.

The anti-entropy system 105 included in the control plane 102 provisions i.e., instantiates the resources for the tenant using the cloud infrastructure services 106. By some embodiments, the anti-entropy system 105 commences the provisioning of the resources by first instantiating the resources at the first level of the resource hierarchy (e.g., kubernetes engine resources) and updates i.e., stores the provisioned resources in the database 106A. Thereafter, the anti-entropy system 105 proceeds to provision the next level of resources e.g., cluster level resources and stores the provisioned resources in the database 106A. In this manner, the anti-entropy system 105 maintains a state of the resources provisioned (in the data plane 104) for the tenant in the database 106A.

Upon provisioning the resources in the data plane 104, the anti-entropy system 105 monitors the resources allocated for each tenant. By some embodiments, the resources allocated for the tenant are long-lived resources. However, in a cloud environment such as the DFIS 100, there may be unexpected failures e.g., failure of a resource, failure of a software component, etc. Thus, tenants who are unaware of such failures may unknowingly assume that the provisioned services are fully functional and expect their queries to be executed in a timely manner. Accordingly, by some embodiments, the anti-entropy system 105 tracks the resources allocated in the data plane 104 for each tenant and fixes/repairs failures of any resource in an automatic manner (i.e., without user intervention) such that a seamless interactive experience is provided to the tenants. By some embodiments, the anti-entropy system 105 is configured to predict and repair failures in the resources allocated in the data plane 104. Details pertaining to the operations of the anti-entropy system 105 are described next with reference to FIG. 2.

It is appreciated that the DFIS architecture depicted in FIG. 1 is intended to be illustrative and non-limiting. As described above, the anti-entropy system 105 provisions the request for the tenant by leveraging workflow as a service (WFaaS) 106B. In some embodiments, the control plane 102 may include a workflow manager that provisions the request for the tenant by leveraging workflow as a service (WFaaS) 106B and overlooks the operations of the anti-entropy system 105.

Figure 2:
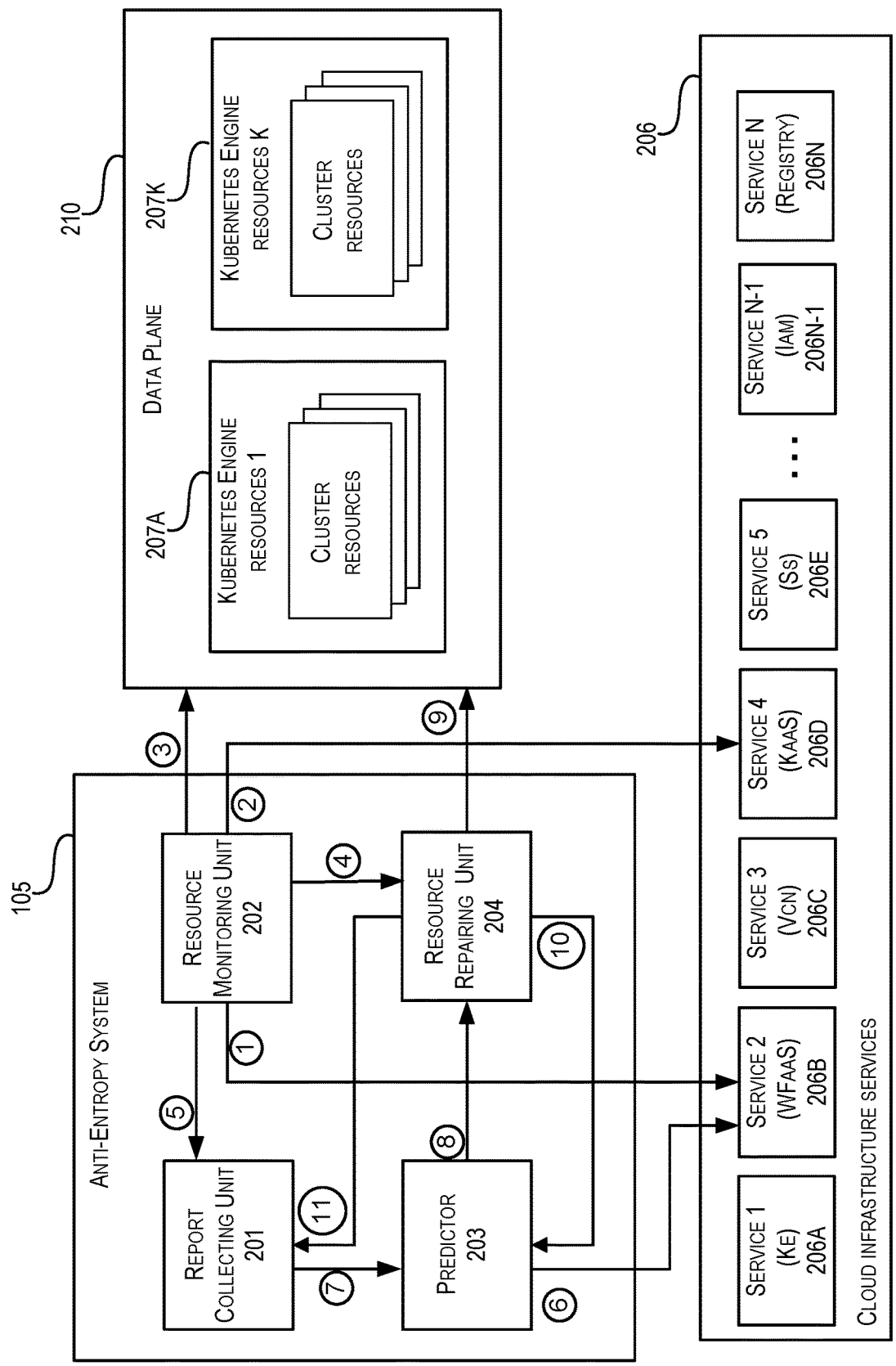
FIG. 2 depicts an exemplary block diagram of an anti-entropy system in accordance with various embodiments.

FIG. 2 depicts an exemplary block diagram of an anti-entropy system in accordance with various embodiments. Also depicted in FIG. 2 is a process flow performed by the anti-entropy system. The anti-entropy system 105 includes a report collecting unit 201, a resource monitoring unit 202, a predictor 203, and a resource repairing unit 204. The anti-entropy system 105 leverages services provided by the cloud infrastructure services 206 to monitor (and repair) resources committed to tenants in the data plane 210 in an automated manner.

By some embodiments, the resource monitoring unit 202 is triggered periodically e.g., via one of the services offered by the cloud infrastructure service 206 e.g., WFaaS 206B. Upon receiving the trigger signal from WFaaS (depicted as step 1), the resource monitoring unit 202 obtains a state of the resources (depicted as step 2) that are committed on the data plane from a database e.g., key value database 206D. Thereafter, the resource monitoring unit 202 monitors the data plane 210 to ensure whether the recorded resources in the database exists in the data plane 210. The monitoring step is depicted as step 3 in FIG. 2. It should be appreciated that the resource monitoring unit 202 is configured to monitor, for each tenant, the resources committed to the tenant in the data plane 210 across all levels of resource hierarchy i.e., level 1, level 2, level 3 etc.

Upon monitoring the resources, if the resource monitoring unit 202 determines that there is a discrepancy between the recorded resources (i.e., resource states maintained in the database 206D) and the actual deployed resources in the data plane 210, then the resource monitoring unit 202 notifies the resource repairing unit 204 of such discrepancies (depicted as step 4), and also further notifies the report collecting unit 201 of the determined discrepancies (depicted as step 5).

By some embodiments, the resource monitoring unit 202 maintains a two-way ordering of the resources. Specifically, in one instance, the resource monitoring unit 202 obtains recorded resource states from the database 206D and ensures that the resources are deployed in the data plane 210. According to another instance, the resource monitoring unit 202 tracks the resources deployed in the data plane 210 and verifies whether the tracked resources are recorded in the database 206D. If the resource monitoring unit 202 determines any discrepancy between the deployed resources in the data plane and the recorded resources in the database 206D, it notifies the resource repairing unit 204 about the discrepancies e.g., an unknown component/resource being accidentally deployed in the data plane 210, such that the resource repairing unit 204 can undertake corrective actions.

By some embodiments, the resource repairing unit 204 performs corrective actions such as starting a compute instance if it is stopped, replacing the compute instance if the instance is not able to start up, replacing a gateway if the status of the gateway is failed, etc. The resource reporting unit 204 updates the report collecting unit 201 with the corrective actions taken with respect to the failed resource(s). Additionally, it should be appreciated that the resource repairing unit 204 is configured to repair a resource at a certain level in the resource hierarchy and also repair resources that are dependent on the resource e.g., child resources at levels below the certain level. For example, if a failure is detected in a node-pool resource (e.g., level 1 resource) then the resource repairing unit 204 repairs the node-pool resource, as well as resources in level 2 (e.g., nodes/instances in the node-pool) and software component resources (i.e., level 3 resources) running in the nodes/instances.

As stated previously, the resource monitoring unit 202 periodically monitors the resources deployed in the data plane 210 and transmits information pertaining to the monitored resources (e.g., failure occurrence of a resource) to the report colleting unit 201, as well as the resource repairing unit 204. By some embodiments, the resource monitoring unit 202 utilizes the following message format to transmit messages to the report collecting unit 201 and the resource repairing unit 204:

message format: timestamp, resource-type (VCN, Kubernetes Engine, Node Pool, etc.), resource-urn, resource-meta-information, region, ad, status, usage-information (node, application, network), where resource-urn is a uniform resource notation that corresponds to an identifier of the resource. Example messages are depicted below in Table 1.

TABLE 1

Sample messages issued by the resource monitoring unit.

| | |
|---|---|
| Example message 1 | timestamp="ts1", resource-type="vcn", resource-urn="vcn-id1", resource-meta-information="meta1", region="us-ashburn-1", ad="ad1", status="failed", usage-information={node={cpu/mem/disk} application={cpu/mem/gc} network={bandwidth/connection-usage}} |
| Example message 2 | timestamp="ts2", resource-type="node", resource-urn="vcn-id2:oke-id2:np12:node-id30", resource-meta-information="meta-data2", ad="us-ashburn-1", ad="ad2", status-"failed", usage-information={node={cpu/mem/disk} application={cpu/mem/gc} network={bandwidth/connection-usage}} |

The report collecting unit 201 obtains information regarding failed resources from the resource monitoring unit 202 and information pertaining to the corrective action(s) (i.e., to repair the failed resources) from the resource repairing unit 204. According to some embodiments, the report collecting unit 201 generates a report of the failures (and corrections) of the resources and provides the generated report to a client device operated by a user. Additionally, the report collecting unit 201 is also configured to determine a trend in the failed resources e.g., number of failures occurring in a predetermined time-period, and provide such information to the client device.

The data plane 210 may serve thousands of tenants. In such a scenario, the resource monitoring unit 202 may require sufficient time to monitor the resource cluster of each tenant and report occurrences of any failures. Furthermore, the resource repairing unit may require additional time to fix the failed resource(s). As such, a failed resource may require an unacceptable amount of time to be repaired. Such delays may lead to poor user experience. By some embodiments, to address this issue, the anti-entropy system 105 utilizes the predictor 203 to proactively predict occurrences of failures in the resources deployed in the data plane 210.

According to some embodiments, the predictor 203 generates and builds one or more machine learning models based on training data obtained from the report collecting unit 201. Specifically, the predictor 203 is triggered via the service WFaaS 206B (depicted as step 6). Upon being triggered, the predictor 203 obtains training data from the report collecting unit 201 (depicted as step 7). By some embodiments, training data corresponds to prior data (i.e., historical data) that is obtained from the resource monitoring unit 202. In the training phase, the predictor generates/updates one or more machine learning models, which can be utilized for performing predictions of failures of resources deployed in the data plane 210.

As shown in FIG. 2, in step 8, the predictor 203 utilizes the trained one or more machine learning models to perform predictions of failures of resources deployed in the data plane 210. The predictions are transmitted to the resource repairing unit 204, which thereafter proceeds to perform corrective actions to repair the failed resources (depicted as step 9). The resource repairing unit 204 upon executing the corrective actions, provides a feedback (step 10) of the actions to the predictor 203. By some embodiments, the predictor 203 utilizes the feedback to further train/modify the one or more machine learning models. By some embodiments, the resource repairing unit 204 also transmits the predictions, a feedback of the predictions (i.e., whether the predictions were accurate or not), and the corrective actions performed on resources in the data plane 210 to the report collecting unit 201 (depicted as step 11). In other words, the report collecting unit 201 may utilize the feedback of the predictions to be used as training data for updating the one or more machine learning models.

The anti-entropy system 105 utilizes the predictor 203 to perform predictions of occurrences of failures in the resources deployed in the data plane 210. By some embodiments, the anti-entropy system 105 triggers the resource monitoring unit 202 (via the WFaaS) at a first frequency. The resource monitoring unit 202 upon being triggered, obtains information pertaining to resource failures. Consequently, the resource repairing unit 204 performs corrective actions on the detected failure resources. Information pertaining to the detection of resource failures and the corrective actions is transmitted to the report collecting unit 201. The report collecting unit 201 provides this information to the predictor, which is used as training data. The predictor utilizes the training data to train one or more machine learning models to predict resource failures.

Upon the one or more machine learning models being fully trained, the anti-entropy system 105 utilizes the one or more trained models for resource failure predictions. Specifically, the anti-entropy system 105 triggers the predictor 203, at a second frequency, to proactively predict the occurrences of failures in the resources deployed in the data plane and utilizes the resource repairing unit 204 to perform corrective actions on the predicted failures. In this manner, while the predictor is activated, the anti-entropy system 105 may de-activate the resource monitoring unit 202 to preserve hardware and software resources. It should be appreciated that the second frequency i.e., the rate at which the trained models of the predictor are activated is greater than the first rate of frequency of activating the resource monitoring unit 202. For instance, the resource monitoring unit 202 may be activated once a week to monitor the resources in the data plane 210 and provide training data for the purpose of training/updating the one or more models of the predictor 203. In contrast, the predictor 203 may be triggered (i.e., activated) to operate the one or more machine learning models in trained mode at the second frequency e.g., once every few minutes.

In what follows, there is provided a detailed description of the predictor 203 of the anti-entropy system 105. Specifically, operation of the predictor in a training phase is describe with reference to FIGS. 3 and 4, and operation of the predictor in a trained phase is described with reference to FIGS. 5 and 6, respectively.

Figure 3:
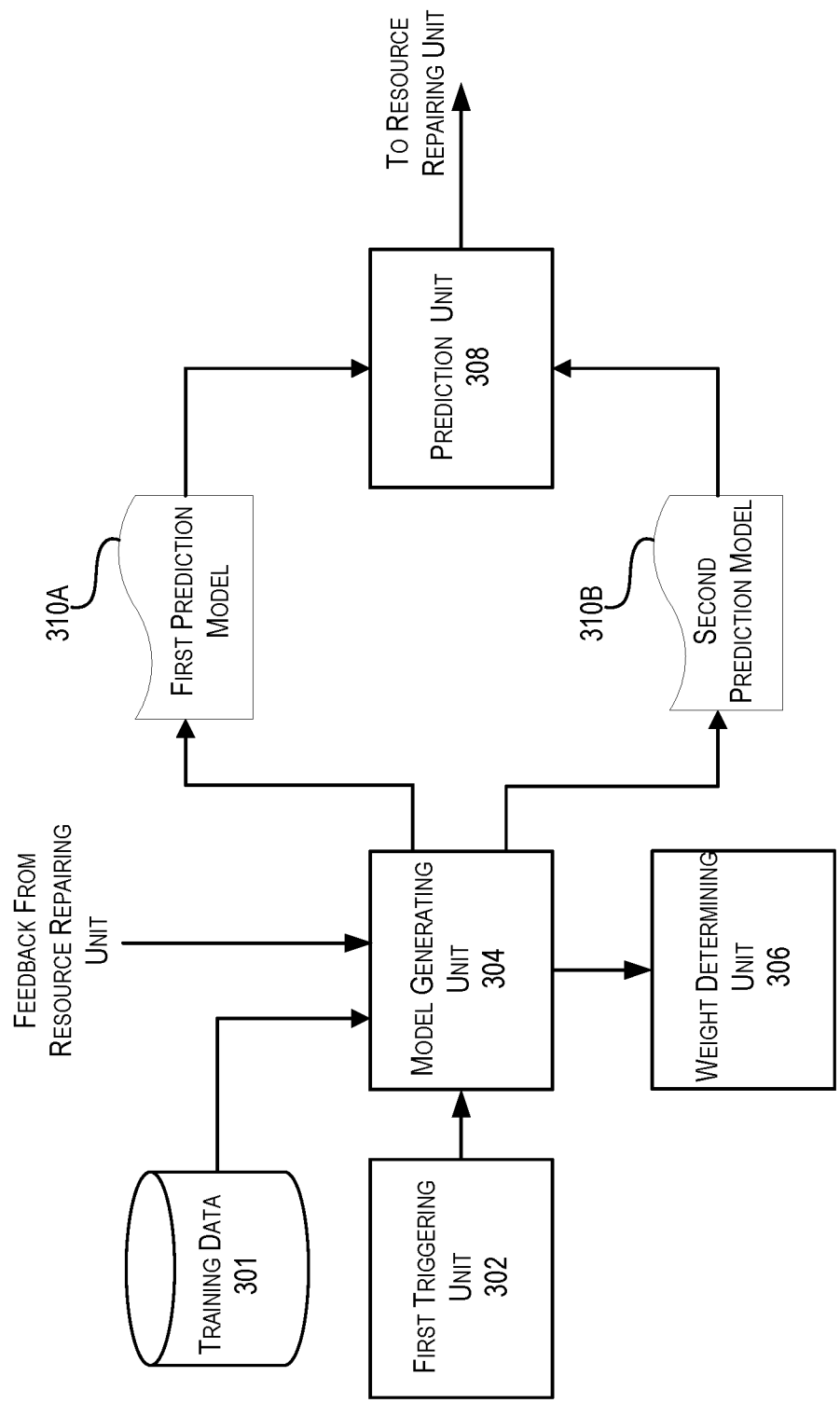
FIG. 3 depicts a block diagram of a predictor operating in a training mode in accordance with at least some embodiments.

FIG. 3 depicts a block diagram of a predictor operating in a training mode in accordance with at least some embodiments. The predictor 203 includes a first triggering unit 302, a model generating unit 304, a weight determining unit 306, and a prediction unit 308. In response to receiving a trigger signal from the first triggering unit 302, the model generating unit 304 retrieves training data from a database 301. The trigger signal from the first triggering unit 302 corresponds to a signal which activates the predictor 203 to operate in a training mode i.e., train/build one or more machine learning models associated with the predictor 203. By some embodiments, the first triggering unit 302 may trigger the model generating unit 304 in response to sufficient amount of training data being available in the database 301. It should be appreciated that the training data corresponds to historical data obtained from the report collecting unit of the anti-entropy system.

By some embodiments, the predictor utilizes a hybrid approach in predicting occurrences of failures in the resources deployed in the data plane. Specifically, upon retrieving training data, the model generating unit 304 generates two predictions models i.e., a first prediction model 310A and a second prediction model 310B. The first prediction model 310A corresponds to a Holt-Winters' prediction model i.e., a multivariate time series forecasting model, whereas the second prediction model 310B corresponds to a Long Short-Term Memory networks (LSTM) Models for time series forecasting. As will be described later with reference to FIG. 5A, an overall prediction of the predictor 203 is based at least in part on a prediction made by the first prediction model 310A, and a prediction performed by the second prediction model 310B.

Accordingly, in order to train the two models, the prediction unit 308 transmits the predictions of the respective models to the resource repairing unit of the anti-entropy system and subsequently obtains a feedback regarding the predictions. Specifically, the model generating unit 304 receives feedback from the resource repairing unit regarding a level of accuracy of the predictions performed by the first prediction model and the second prediction model with respect to failure predictions. The model generating unit 304 transmits the received feedback to the weight determining unit 306. The weight determining unit 306 is configured to assign weights to the first prediction model 310A and the second prediction model 310B based at least in part on the respective level of accuracy of predictions performed by the models. In this manner, the predictor 203 trains the first prediction model 310A and the second prediction model 310B to utilize a hybrid approach to determine an overall prediction of the predictor. Details of the overall prediction are described next with reference to FIG. 5A.

Figure 4:
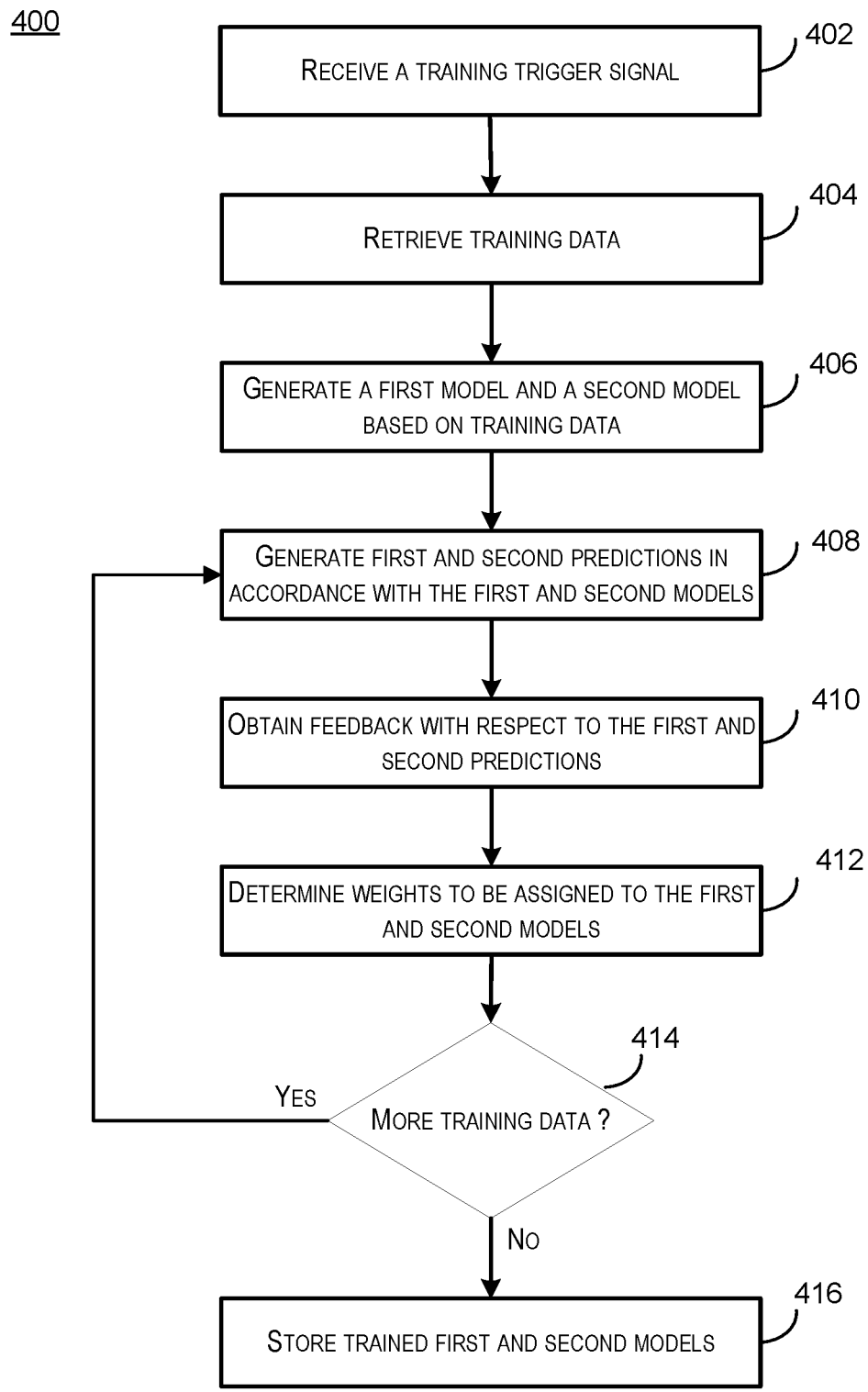
FIG. 4 depicts a flow diagram of training a predictor in accordance with at least some embodiments.

FIG. 4 depicts a flow diagram of training a predictor in accordance with at least some embodiments. The process 400 commences in step 402, wherein the predictor receives a trigger signal to commence training one or more machine learning models. In step 404, the predictor retrieves training data. In step 406, the predictor generates and trains a first prediction model and a second prediction model based at least in part on the retrieved training data.

In step 408, the predictor generates a first prediction with respect to the first prediction model and a second prediction with respect to the second prediction model. Further, in step 410, the predictor receives feedback (from the resource repairing unit) with respect to a level of accuracy of the predictions. Based at least in part on the received feedback, the predictor determines weights to be assigned to the first prediction model and the second prediction model. It should be appreciated that a higher level of accuracy performed by a prediction model with respect to training data results in a higher weight being assigned to the prediction model.

Further, in step 414, a query is performed to determine whether additional training data exists to train the prediction models. If the response to the query is affirmative, then then process loops back to step 408 to continue training the first and second prediction models. However, if the response to the query is negative, the process moves to step 416. In step 416, the trained first prediction model and second prediction model are stored in a database.

Figure 5A:
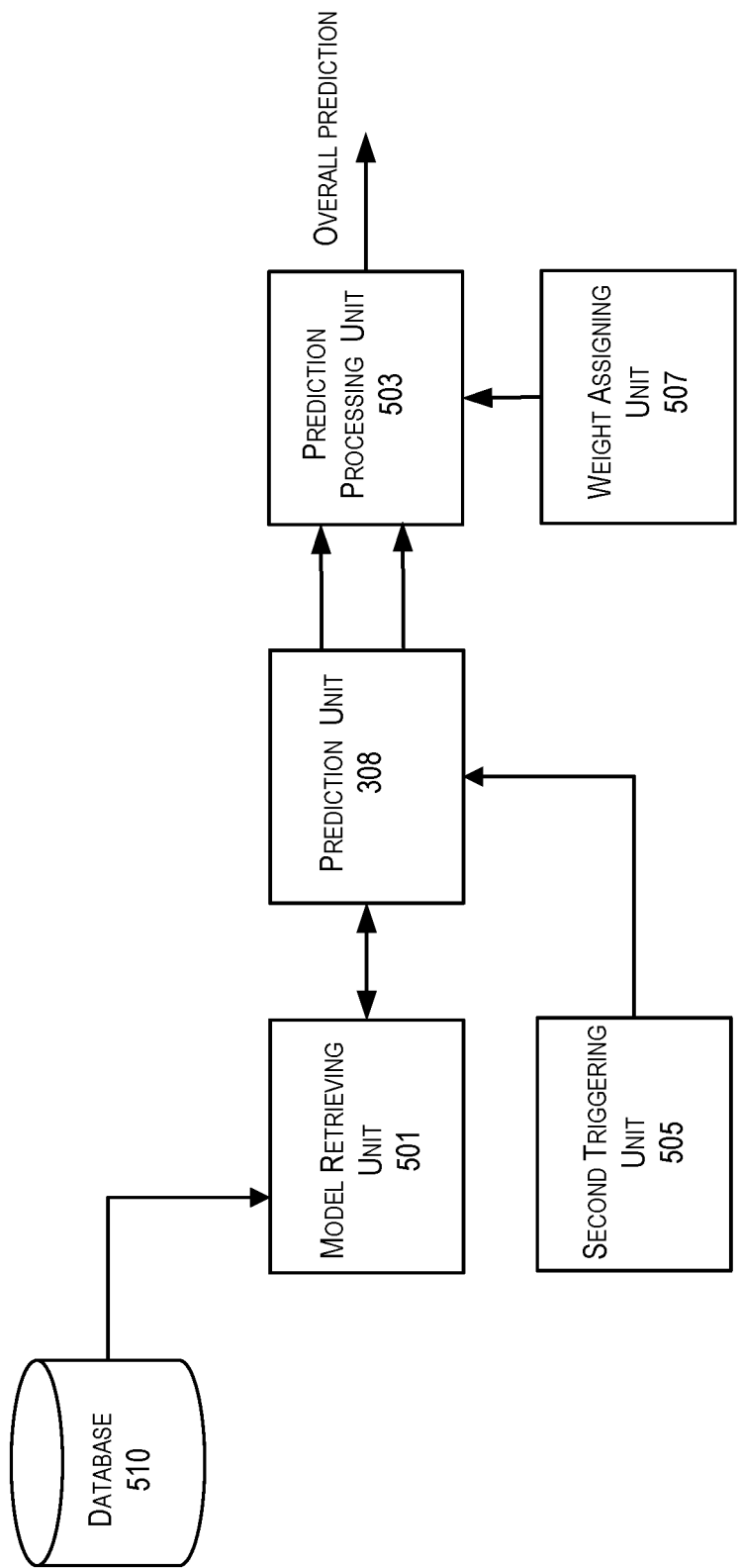
FIG. 5A depicts a block diagram of a trained predictor in accordance with at least some embodiments.

FIG. 5A depicts a block diagram of a predictor in accordance with at least some embodiments. Specifically, the predictor 203 as depicted in FIG. 5A utilizes trained machine learning models to make an overall prediction of a failure of a resource deployed in the data plane. The predictor includes a model retrieving unit 501, a second triggering unit 505, a prediction unit 308, a prediction processing unit 503, and a weight assigning unit 507.

Upon receiving a triggering signal from the second triggering unit 505, the prediction unit 308 transmits a request to the model retrieving unit 501 to retrieve the trained one or more machine learning models from the database 510. Upon retrieving the one or more models e.g., the trained first prediction model 310A and second prediction model 310B (as shown in FIG. 3), the prediction unit 308 generates the two predictions i.e., a prediction made by the first prediction model and another prediction made by the second prediction model. Upon obtaining the two predictions, the prediction processing unit 503 generates an overall prediction. The prediction processing unit 503 obtains weights that are to be assigned to the predictions made by the two models. It should be appreciated that the weight assigning unit 507 obtains the respective weights to be assigned to the predictions of the first prediction model and the second prediction model from the weight determining unit as described previously in FIG. 3.

According to some embodiments, if p1 corresponds to the prediction performed by the first prediction model, and p2 corresponds to the prediction performed by the second prediction model, the prediction processing unit 503 determines an overall prediction as: max (p1*w1, p2*w2), where w1, w2 are the respective weights assigned to the first prediction model and second prediction model, respectively. The overall prediction performed by the predictor is transmitted to the resource repairing unit of the anti-entropy system, which thereafter proceeds to repair i.e., fix the predicted failures in the resources deployed in the data plane.

Figure 5B:
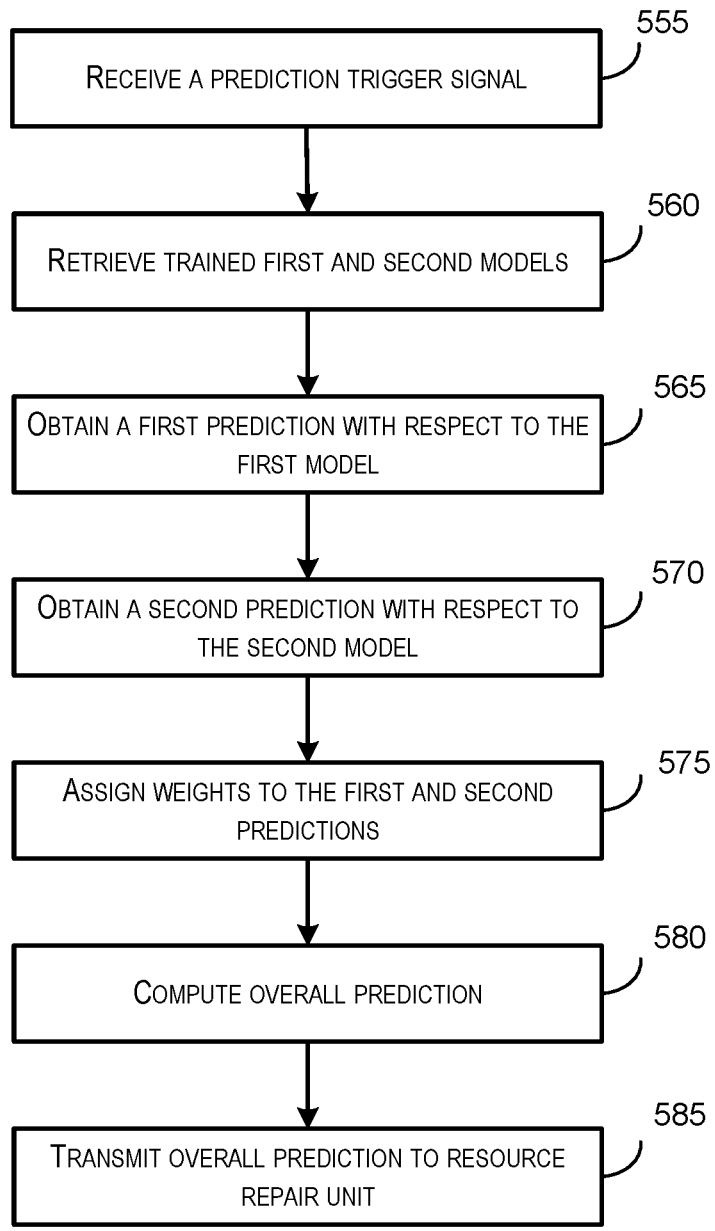
FIG. 5B depicts a flow diagram illustrating an example process of prediction performed by the predictor in accordance with some embodiments.

FIG. 5B depicts a flow diagram illustrating an example process of prediction performed by the predictor in accordance with some embodiments. The process 550 commences in step 555 wherein a prediction trigger signal is received by the predictor. In step 560, the predictor retrieves trained first and second prediction models from a database.

In step 566, a first prediction with respect to the first prediction model is obtained, and in step 570, a second prediction with respect to the second prediction model is obtained. In step 575, weights are assigned to the first prediction and the second prediction. In step 580, the predictor computes an overall prediction based at least in part on the first prediction, the second prediction, a first weight assigned to the first prediction, or the second weight assigned to the second prediction. Thereafter, in step 585, the predictor transmits the computed overall prediction to a resource repairing unit, which thereafter proceeds to repair i.e., perform corrective actions with respect to the predicted failures of the resources deployed in the data plane.

Some or all of the processes 400 and 550 depicted in FIGS. 4 and 5B, respectively, (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the processes described herein may be performed by one or more elements of a cloud platform The code may be stored on a computer-readable storage medium, for example, in the form of a computer program including a plurality of instructions executable by one or more processors. The computer-readable storage medium may be non-transitory.

Figure 6:
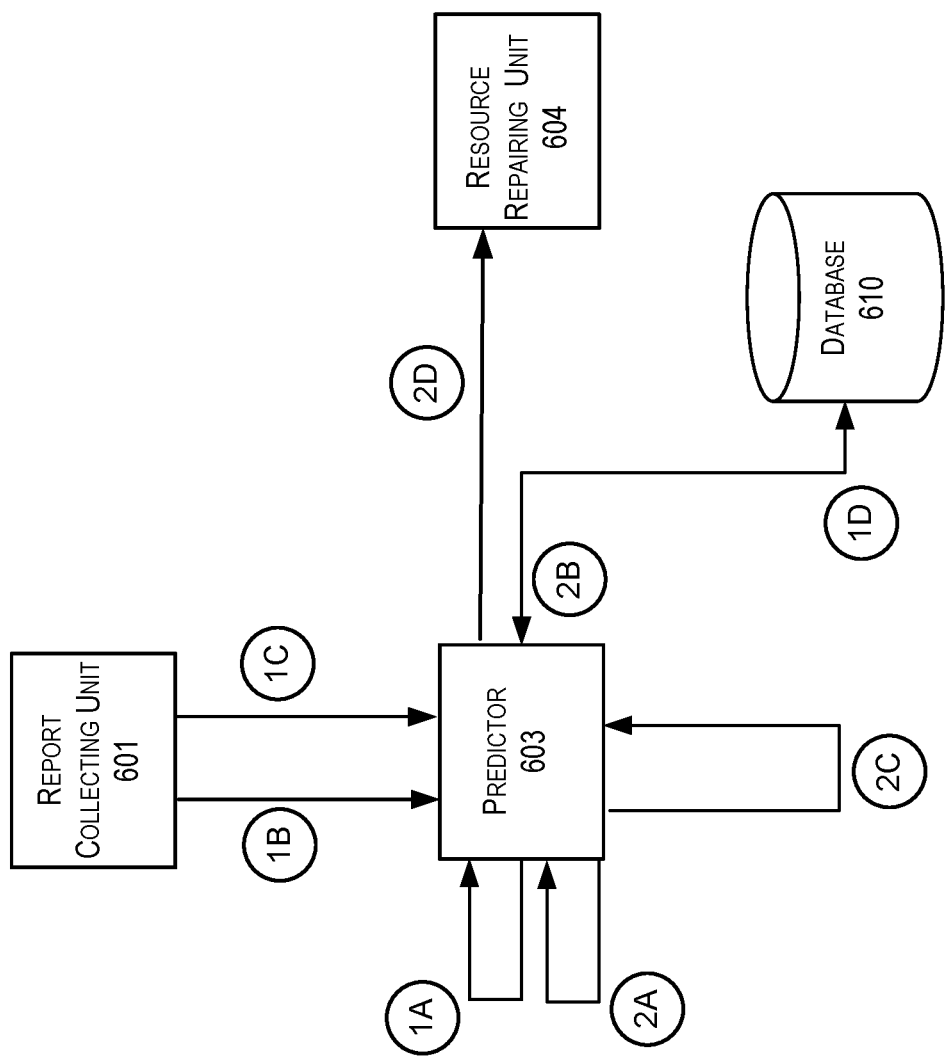
FIG. 6 illustrates a process flow performed by a predictor in accordance with some embodiments.

FIG. 6 illustrates a process flow performed by a predictor in accordance with some embodiments. In step 1A, the predictor 603 is triggered to commence a model building process. By one embodiment, the predictor is triggered (e.g., via the first triggering unit 302 of FIG. 3) to perform the model building process in accordance with a schedule e.g., triggered on a weekly basis. The predictor 603 utilizes a hybrid approach by having two types of models: (1) a Holt-Winter's seasonal method with trending machine learning model and (2) a Long Short-Term Memory networks (LSTM) Model for time-series forecasting. Upon being triggered to perform the model building process, the predictor in step 1B builds the Holt-Winter's seasonal method with trending machine learning model based at least in part on training data obtained from a report collecting unit 601. According to an embodiment, the training data used to train/build the model may be obtained over a long span of time e.g., two years. Furthermore, it is appreciated that the training data includes previous predictions and feedback corresponding to the previous predictions (i.e., whether the previous predictions were accurate or faulty). Moreover, it is appreciated that the training data is obtained over a long span of time to incorporate for seasonality and trending effects in predicting failures of the resources. Furthermore it is appreciated that although prediction models such as auto regression, moving average, autoregressive moving average, vector auto regression, simple exponential smoothing, etc., may be utilized to predict failures, the LSTM model and the Holt-Winter's model may produce different (and potentially better) results. The LSTM model is well suited for classifying, processing, and making predictions based on time series data, whereas the Holt-Winter's model provides a mechanism to perform predictions based on trending events and seasonality factors.

In step 1C, the predictor 603 builds the Long Short-Term Memory networks (LSTM) Model for time-series forecasting model based at least in part on the training data obtained from the report collecting unit 601. It is noted that the LSTM model is also built utilizing the training data obtained over a long span of time e.g., two years. Further, in step 1D, the predictor 603 stores both the built models in a persistent storage i.e., database 610. As described above, steps 1A to 1D pertain to the process of model building as performed by the predictor 603. Steps 2A to 2D described below pertain to a prediction process performed by the predictor 603.

In step 2A, the predictor 603 is triggered (e.g., via the second triggering unit 505 of FIG. 5A) on a periodic basis to perform the prediction process. According to one embodiment, the predictor 603 is triggered periodically in the order of a few minutes e.g., 5 minutes. Upon being triggered, the predictor 603 in step 2B, loads the two machine learning models from the persistent storage i.e., database 610. In step 2C, the predictor 603 performs two predictions. Specifically, the predictor 603 performs a first prediction (p1) using the Holt-Winter's seasonal method with trending machine learning model, and a second prediction (p2) using the LSTM model. Upon performing the predictions p1 and p2, the predictor 603 in step 2C evaluates a final (i.e., overall) prediction. Specifically, the predictor 603 evaluates the overall prediction as: max (p1*w1, p2*w2), where w1 and w2 are the respective weights assigned to the two models. According to some embodiments, the weights w1 and w2 that are assigned to the two models are determined based in part on a level of accuracy of previous predictions made by the respective models. For example, with respect to a total number of prior predictions made by each model, a number of accurate failure predictions (i.e., a metric) can be computed that can be utilized to compute a percentage of accurate failure predictions. The percentage of accurate predictions corresponds to a level of accuracy associated with the model. Accordingly, the model having a higher level of accuracy can be assigned a higher weight. In step 2D, the predictor 603 transmits the overall prediction to the resource repairing unit 604, which in turn proceeds to execute a resource repairing process.

In the above described operations of the predictor, it is noted that the predictor executes the model building/updating process on a periodic basis e.g., weekly basis. Thus, upon an execution of the model building/updating process, the predictor determines weights to be assigned to the two models. Thereafter, the weights are used by the predictor while executing the prediction process i.e., when the predictor is triggered periodically e.g. five minutes to perform resource failure(s) prediction. The weights assigned to the models are updated when the predictor executes the next instance of the model building/updating process. Further, it is noted that in the prediction process, the predictor is triggered periodically (e.g., five minutes) as opposed to being continuously activated to perform predictions. In this manner, the anti-entropy system performs predictions of resource failures by utilizing computational resources in an efficient manner.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
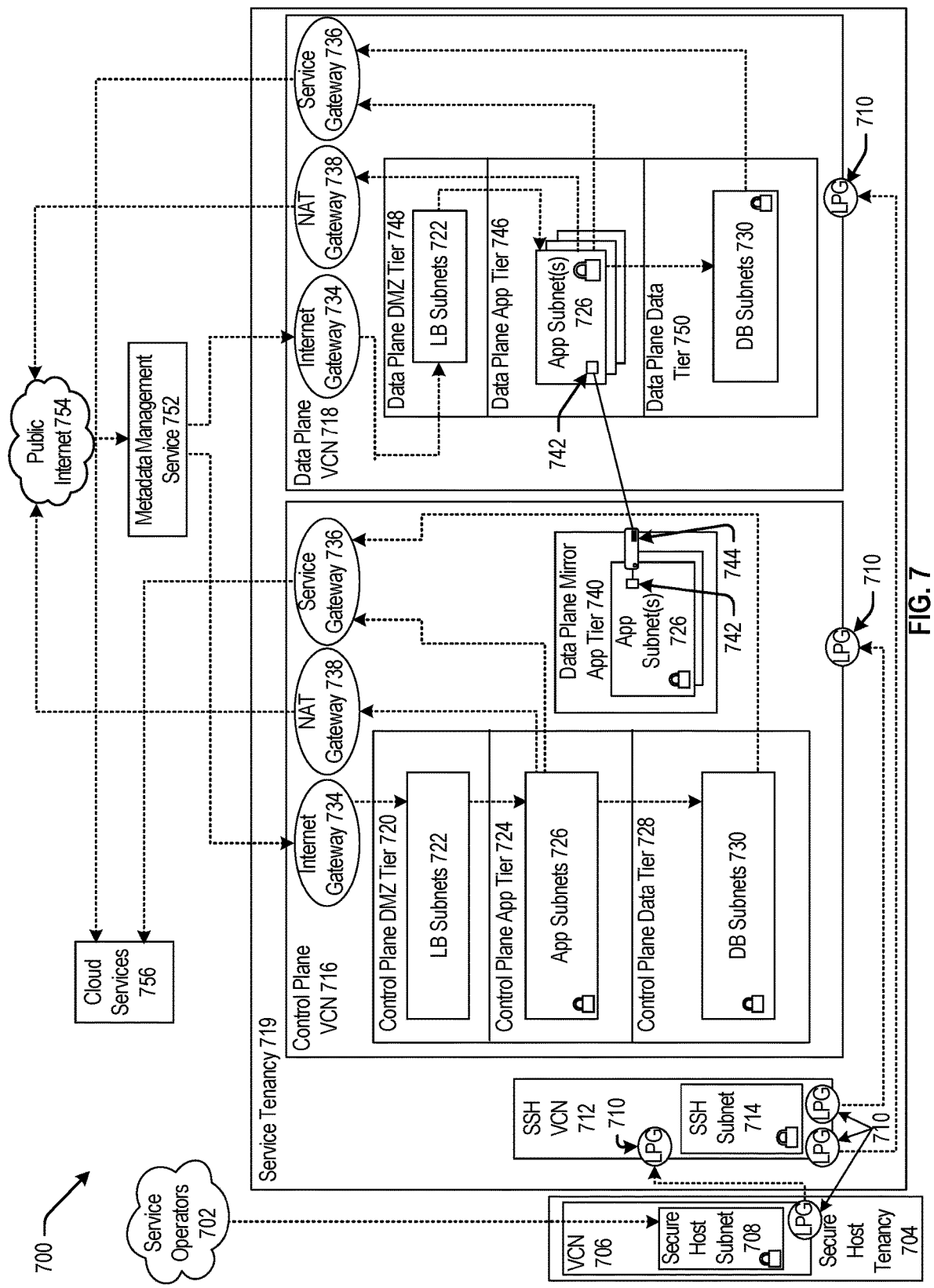
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
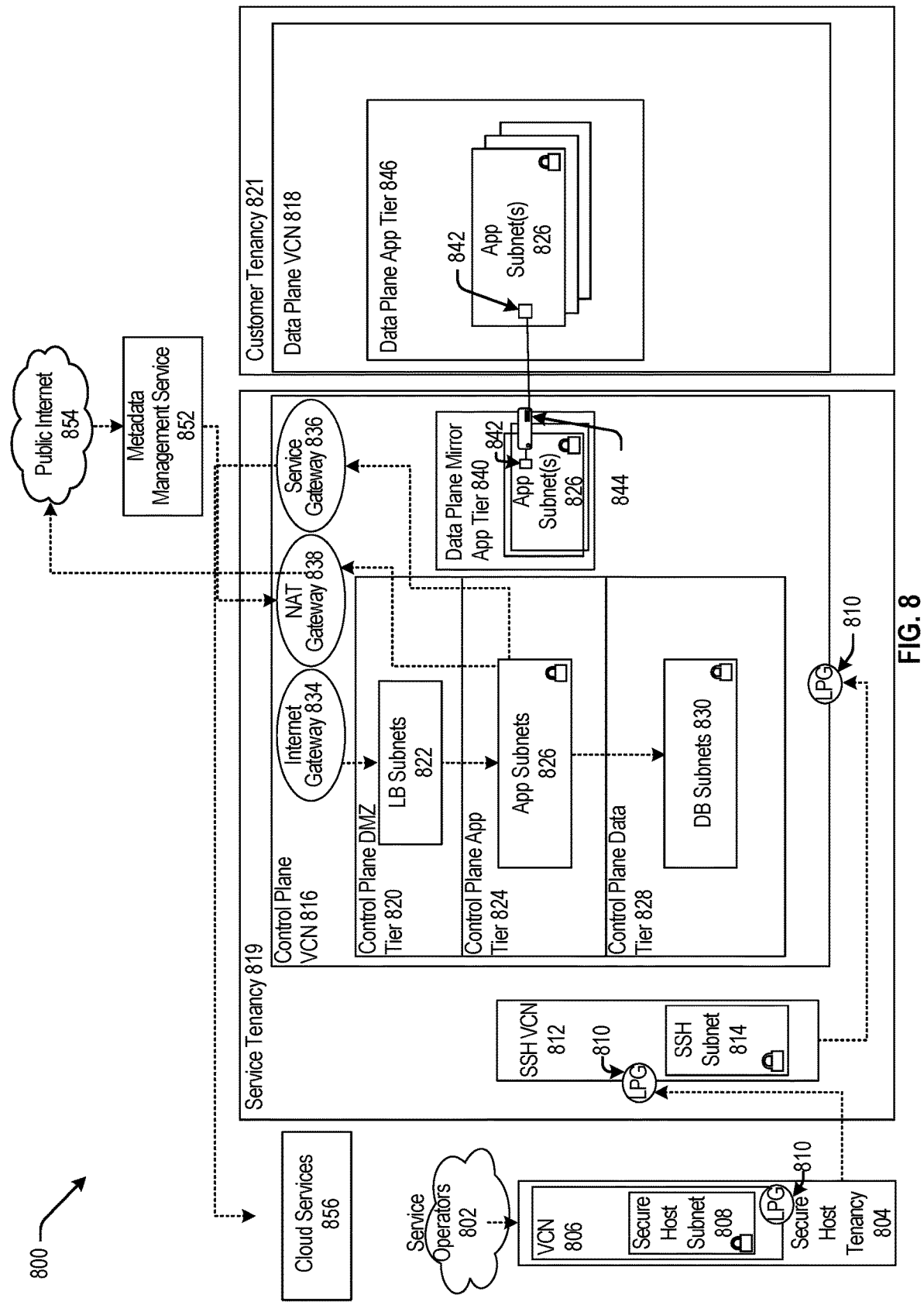
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 6," may be located in Region 1 and in "Region 2." If a call to Deployment 6 is made by the service gateway 836 contained in the control plane VCN 816 located in Region 1, the call may be transmitted to Deployment 6 in Region 1. In this example, the control plane VCN 816, or Deployment 6 in Region 1, may not be communicatively coupled to, or otherwise in communication with, Deployment 6 in Region 2.

Figure 9:
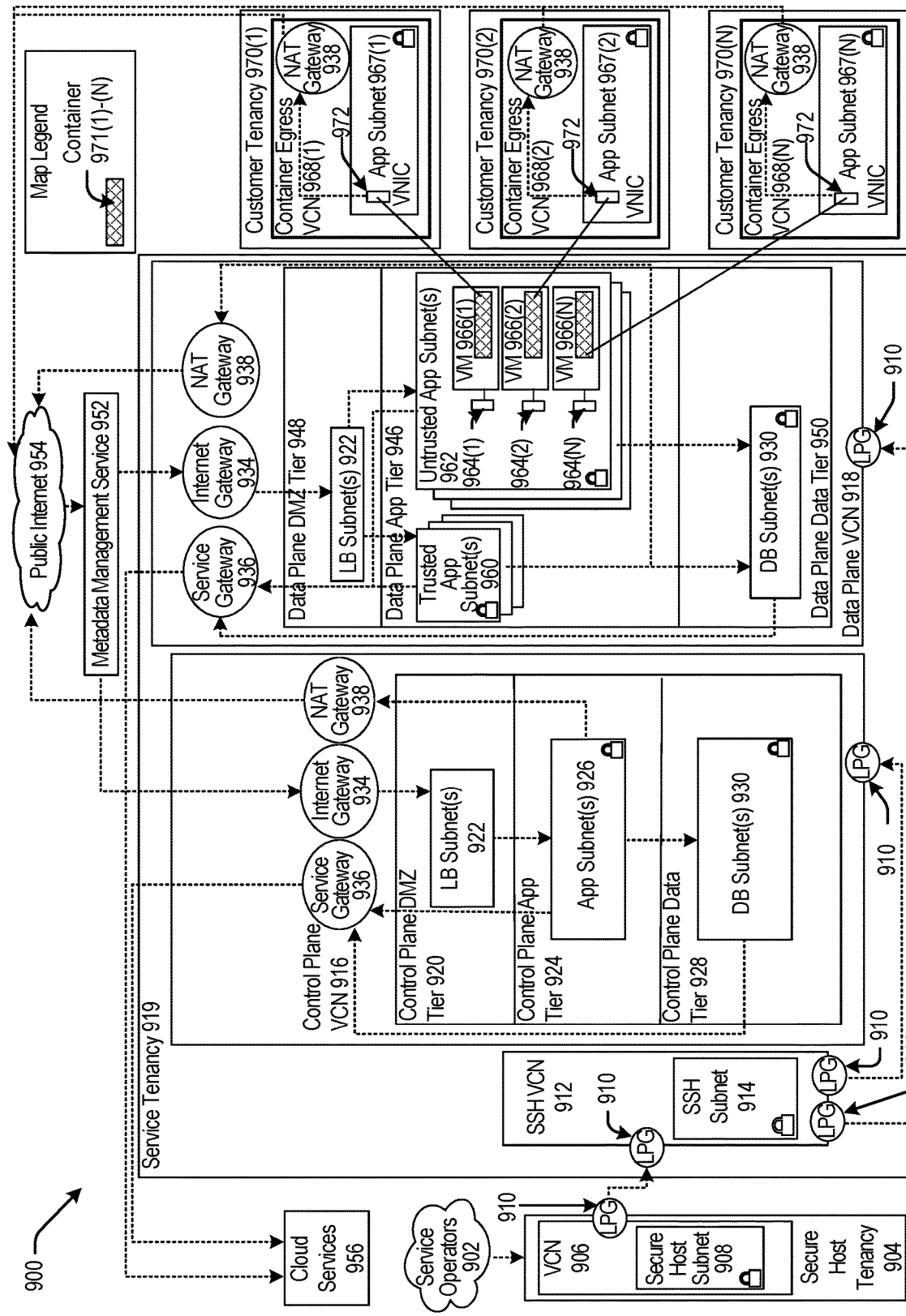
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
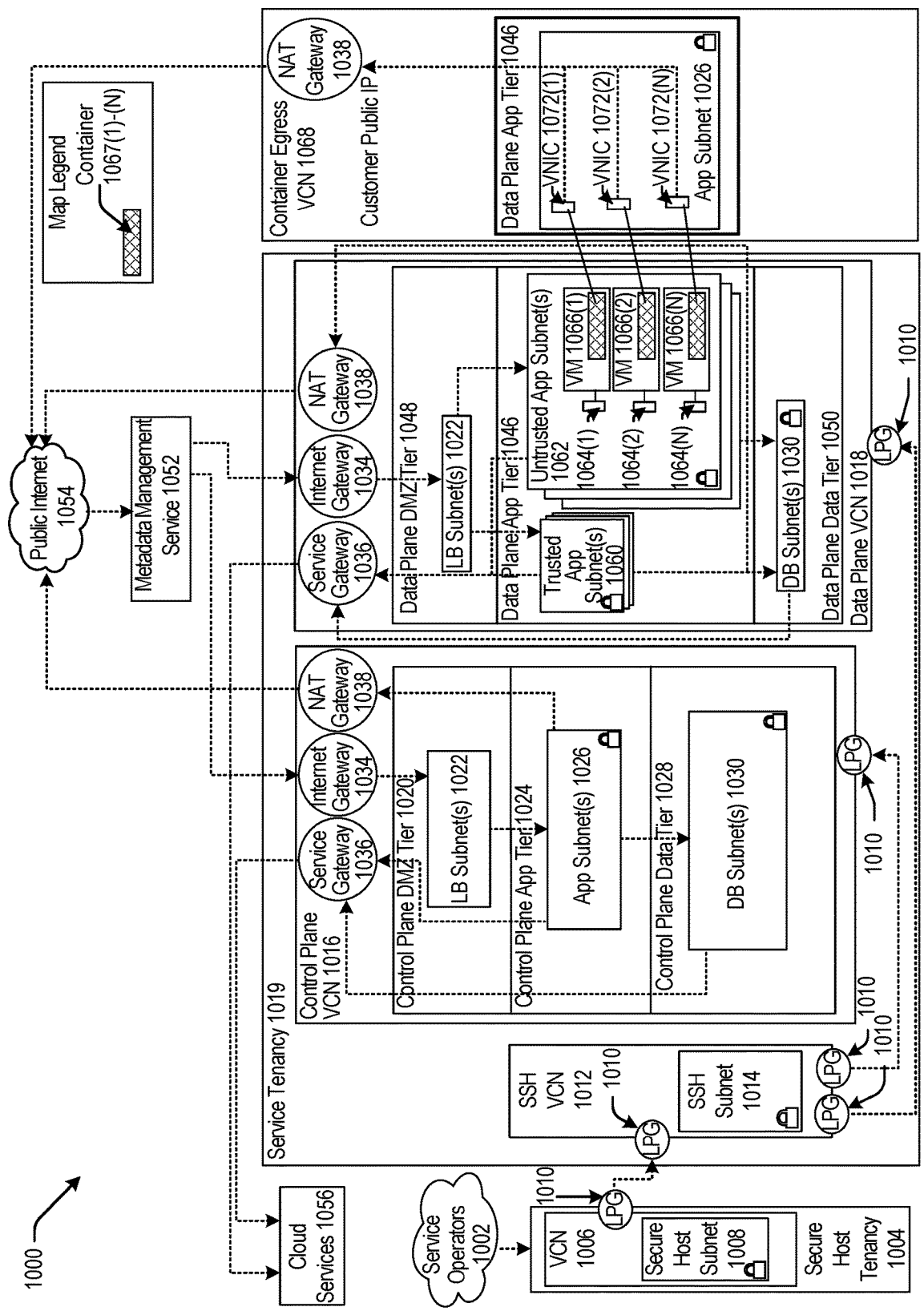
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 800 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
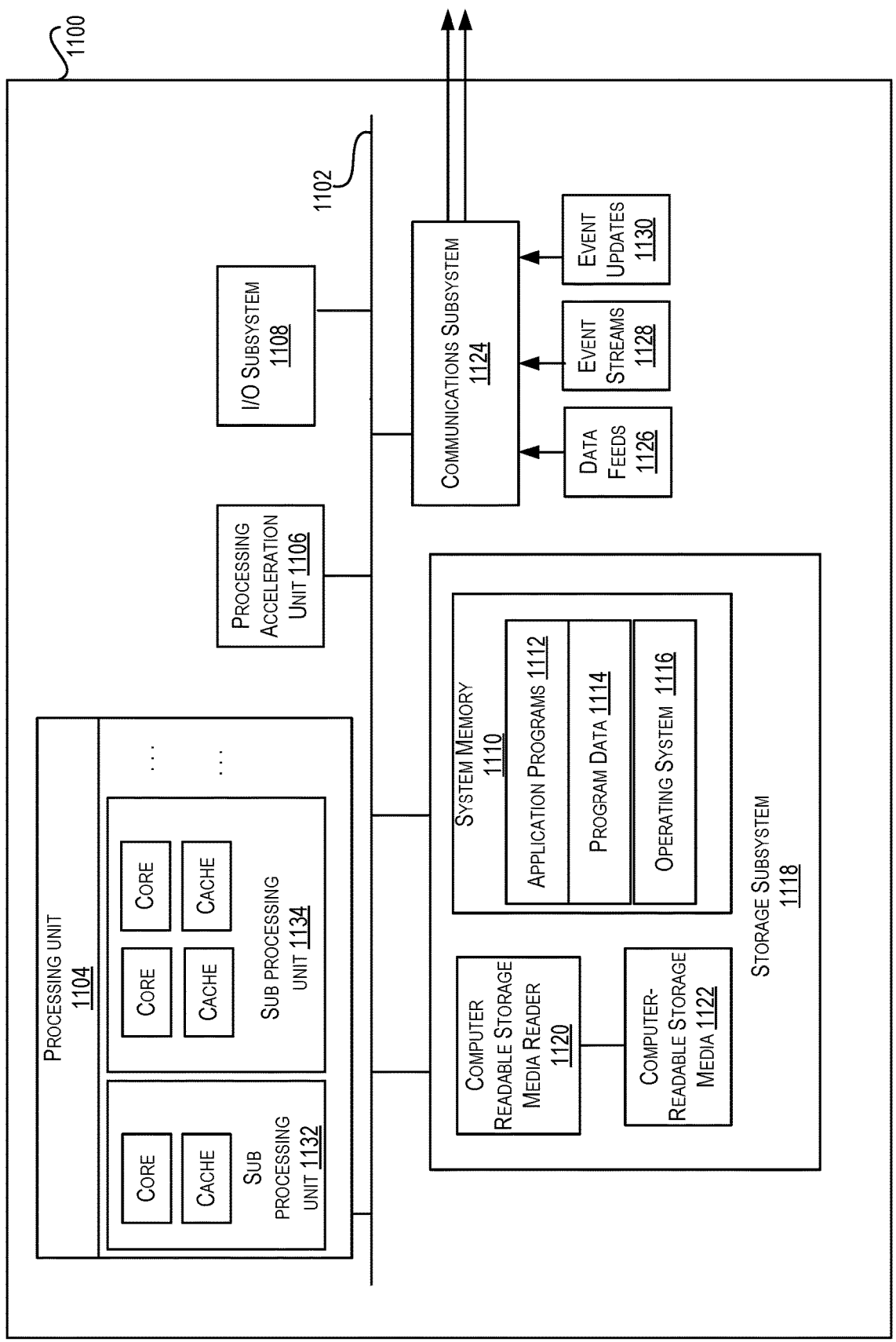
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1000 to connect to one or more devices via the Internet. In some embodiments communications subsystem 1124 can include radio frequency (RF)

transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   training at least one of a first prediction model or a second prediction model based at least in part on training data;
   retrieving the first prediction model and the second prediction model from a database;
   applying the first prediction model to obtain a first prediction of a failure of a resource;
   applying the second prediction model to obtain a second prediction of the failure of the resource;
   calculating, a first metric related to prior failure predictions performed by the first prediction model, and a second metric related to prior failure predictions performed by the second prediction model;
   calculating a level of accuracy of predictions performed by each of the first prediction model and the second prediction model based at least in part on the first metric and the second metric;
   determining a first weight to be assigned to the first prediction and a second weight to be assigned to the second prediction based at least in part on the level of accuracy of predictions performed by the first prediction model and the second prediction model;
   calculating a first weighted prediction based at least in part on the first weight and the first prediction, and a second weighted prediction based at least in part on the second weight and the second prediction;
   computing an overall prediction of the failure of the resource based at least in part on the first weighted prediction or the second weighted prediction;
   transmitting the overall prediction for restoring the failure of the resource, the resource being one of a plurality of cloud based resources arranged in a hierarchical manner and allocated to a client device; and
   further training at least one of the first prediction model or the second prediction model based at least in part on feedback for the first prediction or the second prediction.

2. The method of claim 1, further comprising:
   monitoring for the failure of the resource in response to receiving a first trigger signal;
   detecting the failure of the resource;
   responsive to detecting the failure of the resource:
      correcting the failure of the resource; and
      adding information pertaining to the failure of the resource to the training data.

3. The method of claim 2, wherein at least one of the first prediction model or the second prediction model are retrieved from the database in response to receiving a second trigger signal.

4. The method of claim 3, wherein a first frequency of receiving the first trigger signal is less than a second frequency of receiving the second trigger signal.

5. The method of claim 1, wherein the first prediction model is a Holt-Winter's seasonal method with trending machine learning model, and the second prediction model is a Long Short-Term Memory network (LSTM) model for time-series forecasting.

6. The method of claim 1, further comprising:
   determining the overall prediction to be a maximum of the first weighted prediction and the second weighted prediction.

7. The method of claim 6, further comprising:
   generating a report indicating failures of each resource of the plurality of cloud based resources;
   identifying a trend of failed resources over a time-period; and
   providing the report and the trend of failed resources to the client device.

8. A computing device comprising:
   a processor; and
   a memory including instructions that, when executed with the processor, cause the computing device to, at least:
      train at least one of a first prediction model or a second prediction model based at least in part on training data;
      retrieve the first prediction model and the second prediction model from a database;
      apply the first prediction model to obtain a first prediction of a failure of a resource;
      apply the second prediction model to obtain a second prediction of the failure of the resource;
      calculate, a first metric related to prior failure predictions performed by the first prediction model, and a second metric related to prior failure predictions performed by the second prediction model;
      calculate a level of accuracy of predictions performed by each of the first prediction model and the second prediction model based at least in part on the first metric and the second metric;
      determine a first weight to be assigned to the first prediction and a second weight to be assigned to the second prediction based at least in part on the level of accuracy of predictions performed by the first prediction model and the second prediction model;
      calculate a first weighted prediction based at least in part on the first weight and the first prediction, and a second weighted prediction based at least in part on the second weight and the second prediction;
      compute an overall prediction of the failure of the resource based at least in part on the first weighted prediction or the second weighted prediction;
      transmit the overall prediction for restoring the failure of the resource, the resource being one of a plurality of cloud based resources arranged in a hierarchical manner and allocated to a client device; and further train at least one of the first prediction model or the second prediction model based at least in part on feedback for the first prediction or the second prediction.

9. The computing device of claim 8, wherein the instructions when executed with the processor, cause the computing device to further:
monitor for the failure of the resource in response to receiving a first trigger signal;
detect the failure of the resource;
responsive to detecting the failure of the resource:
correct the failure of the resource; and
add information pertaining to the failure of the resource to the training data.

10. The computing device of claim 9, wherein at least one of the first prediction model or the second prediction model are retrieved from the database in response to receiving a second trigger signal.

11. The computing device of claim 10, wherein a first frequency of receiving the first trigger signal is less than a second frequency of receiving the second trigger signal.

12. The computing device of claim 8, wherein the first prediction model is a Holt-Winter's seasonal method with trending machine learning model, and the second prediction model is a Long Short-Term Memory network (LSTM) model for time-series forecasting.

13. The computing device of claim 8, wherein the instructions when executed with the processor, cause the computing device to further:
determine the overall prediction to be a maximum of the first weighted prediction and the second weighted prediction.

14. The computing device of claim 13, wherein the instructions when executed with the processor, cause the computing device to further:
generate a report indicating failures of each resource of the plurality of cloud based resources;
identify a trend of failed resources over a time-period; and
provide the report and the trend of failed resources to the client device.

15. A non-transitory computer readable medium storing specific computer-executable instructions that, when executed by a processor, cause a computer system to at least:
train at least one of a first prediction model or a second prediction model based at least in part on training data;
retrieve the first prediction model and a second prediction model from the database;
apply the first prediction model to obtain a first prediction of a failure of a resource;
apply the second prediction model to obtain a second prediction of the failure of the resource;
calculate, a first metric related to prior failure predictions performed by the first prediction model, and a second metric related to prior failure predictions performed by the second prediction model;
calculate a level of accuracy of predictions performed by each of the first prediction model and the second prediction model based at least in part on the first metric and the second metric;
determine a first weight to be assigned to the first prediction and a second weight to be assigned to the second prediction based at least in part on the level of accuracy of predictions performed by the first prediction model and the second prediction model;
calculate a first weighted prediction based at least in part on the first weight and the first prediction, and a second weighted prediction based at least in part on the second weight and the second prediction;
compute an overall prediction of the failure of the resource based at least in part on the first weighted prediction or the second weighted prediction;
transmit the overall prediction for restoring the failure of the resource, the resource being one of a plurality of cloud based resources arranged in a hierarchical manner and allocated to a client device; and
further train at least one of the first prediction model or the second prediction model based at least in part on feedback for the first prediction or the second prediction.

16. A non-transitory computer readable medium claim 15, wherein the computer system is further configured to:
monitor for the failure of the resource in response to receiving a first trigger signal;
detect the failure of the resource;
responsive to detecting the failure of the resource:
correct the failure of the resource; and
add information pertaining to the failure of the resource to the training data.

17. A non-transitory computer readable medium of claim 16, wherein at least one of the first prediction model or the second prediction model are retrieved from the database in response to receiving a second trigger signal.

18. A non-transitory computer readable medium of claim 17, wherein a first frequency of receiving the first trigger signal is less than a second frequency of receiving the second trigger signal.

19. A non-transitory computer readable medium of claim 15, wherein the first prediction model is a Holt-Winter's seasonal method with trending machine learning model, and the second prediction model is a Long Short-Term Memory network (LSTM) model for time-series forecasting.

20. A non-transitory computer readable medium claim 15, wherein the computer system is further configured to:
determine the overall prediction to be a maximum of the first weighted prediction and the second weighted prediction.

* * * * *

UNITED STATES PATENT AND TRADEMARK OFFICE
CERTIFICATE OF CORRECTION

| | |
|---|---|
| PATENT NO. | : 11,797,414 B2 |
| APPLICATION NO. | : 17/200228 |
| DATED | : October 24, 2023 |
| INVENTOR(S) | : Kavali et al. |

It is certified that error appears in the above-identified patent and that said Letters Patent is hereby corrected as shown below:

In the Claims

In Column 30, Line 26, in Claim 16, after "medium" insert -- of --, therefor.

In Column 30, Line 48, in Claim 20, after "medium" insert -- of --, therefor.

Signed and Sealed this
Eleventh Day of June, 2024

Katherine Kelly Vidal
*Director of the United States Patent and Trademark Office*